March 22, 1966  J. S. LAIRD ETAL  3,241,688
BRICK STACKING DEVICE

Filed Sept. 22, 1961  7 Sheets-Sheet 2

FIG. 2.

Inventors
John Stephen Laird and
Alexander Stephens
by Morgan, Finnegan, Durham and Pine, Attorneys.

March 22, 1966   J. S. LAIRD ETAL   3,241,688
BRICK STACKING DEVICE

Filed Sept. 22, 1961   7 Sheets-Sheet 3

Inventors
John Stephen Laird and
Alexander Stephens
by Morgan, Finnegan, Durham and Pine, Attorneys.

March 22, 1966  J. S. LAIRD ETAL  3,241,688
BRICK STACKING DEVICE

Filed Sept. 22, 1961  7 Sheets-Sheet 4

FIG. 4.

Inventors
John Stephen Laird and
Alexander Stephens
by Morgan, Finnegan, Durham and Pine, Attorneys.

March 22, 1966  J. S. LAIRD ETAL  3,241,688
BRICK STACKING DEVICE

Filed Sept. 22, 1961  7 Sheets-Sheet 5

Inventors
John Stephen Laird and
Alexander Stephens
by Morgan, Finnegan, Durham and Pine, Attorneys.

March 22, 1966   J. S. LAIRD ETAL   3,241,688
BRICK STACKING DEVICE

Filed Sept. 22, 1961   7 Sheets-Sheet 7

Inventors
John Stephen Laird and
Alexander Stephens
by Morgan, Finnegan, Durham and Pine, Attorneys.

United States Patent Office 3,241,688
Patented Mar. 22, 1966

3,241,688
BRICK STACKING DEVICE
John Stephen Laird, 11 Withins Road, and Alexander Stephens, 92 Common Lane, both of Culcheth, near Warrington, Lancashire, England
Filed Sept. 22, 1961, Ser. No. 140,061
Claims priority, application Great Britain, June 28, 1960, 26,372/60; June 27, 1961, 23,306/61
14 Claims. (Cl. 214—6)

The invention relates to a method and means of removing bricks or other like articles, advantageously in pairs, from the table of a rotary mould press into a stacked position on a wagon or bogie on which they can conveniently be removed for further processing such as curing, firing or steaming. This operation is normally carried out by hand and though attempts have been made to carry out the operations automatically by mechanical means, such constructions have not proved commercially satisfactory.

The invention has among its objects to provide a method and means including a rotary off-loader for carrying out this operation effectively, and quickly on a machine which is of robust construction but which is controlled in its movements in such manner as not to damage the bricks.

A further object of the invention is to provide a machine which operates at relatively high speed and in which the rotary off-loader is so constructed that it cannot possibly move out of phase, once it is set. A further object is to provide a rotary off-loader which is directly driven where known off-loaders have hitherto been indirectly driven.

According to the present invention, freshly moulded bricks are presented by the press table for removal at a discharge station. Preferably, the bricks, preferably two at a time, are lifted out from the press by suction heads mounted on a novel rotary transfer device, which rotates the bricks during transfer and deposits the bricks on their edges on a moving conveyor extending radially of the transfer device. Cooperating with the travelling conveyor is a travelling carriage which properly aligns and arranges the bricks on the conveyor.

When a pre-determined number of bricks have been suitably arranged on the conveyor, an overhead pressure grapple or grab unit is actuated to remove the bricks from the conveyor, preferably several rows at a time, to a transport for carrying the bricks to a firing kiln or furnace. The grapple operating means is effective to arrange the bricks in a taper or truncated pyramid if desired so that the transport can more easily enter the generally-arched furnace door.

Objects and advantages of the invention will be obvious herefrom, or may be learned by practice with the invention, the same being realized and attained by means of the instrumentalities and combinations pointed out in the appended claims.

The invention is diagrammatically illustrated by way of example in the accompanying drawings, in which.

In carrying the invention into effect according to one construction as illustrated in FIGURES 1 to 6 of the accompanying drawings, a rotary take-off or off-loader mechanism A is provided to take off the moulded bricks from a rotary press table B of known construction, and to deposit them on a conveyor belt C from which they are removed by a grab D and deposited on a wagon E on which they are moved into a kiln or furnace for further treatment as by firing steaming or the like. The take-off mechanism rotates in a direction opposite to the direction of rotation of the press table, and is so positioned as to overlap the press table at the circumferential edge.

Figure 3:
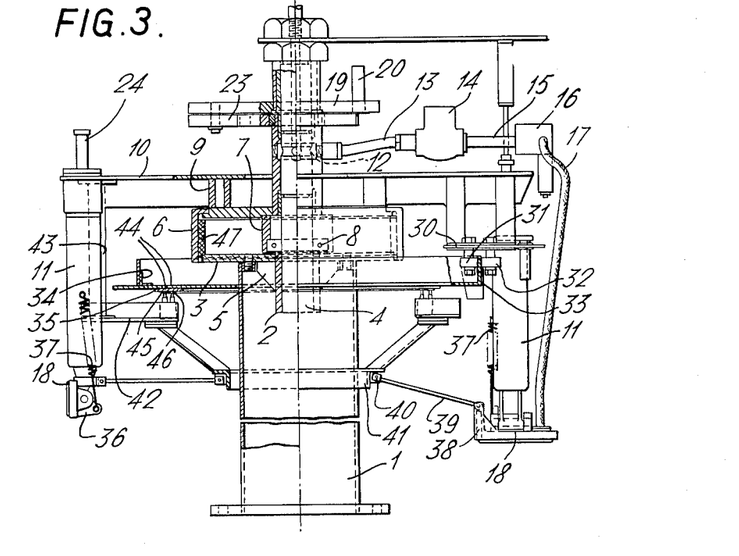
FIGURE 3 is a sectional side elevation of the rotary off loader.
Figure 4:
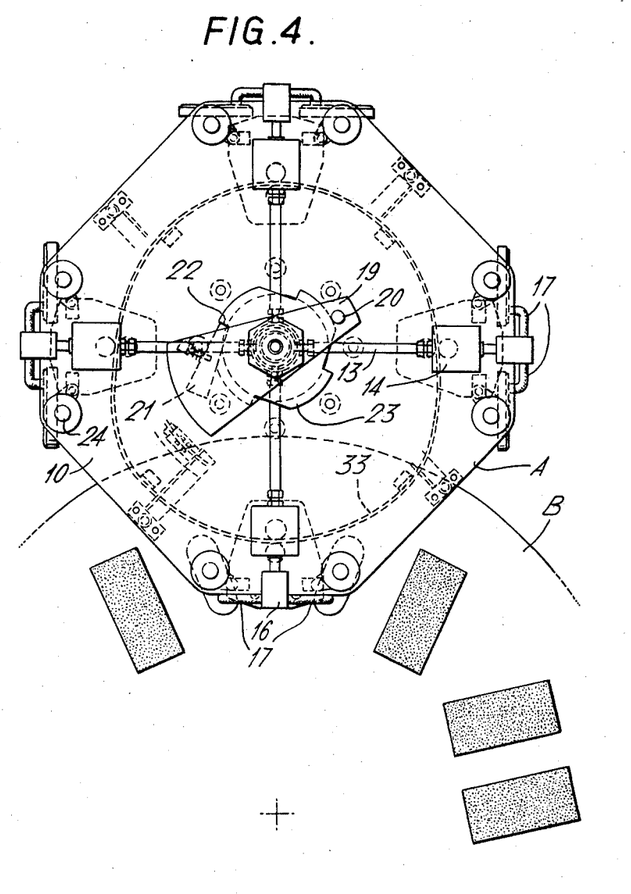
FIGURE 4 is a corresponding plan.

The take-off mechanism consists of a centre pillar 1 which is stationary and which supports at the upper end on a shaft location flange 3 a centre shaft 2 the lower part 4 of which is mounted in a bracket 5 secured to the flange 3. Supporting an inverted cup-shaped member 6 is a sleeve member 7 rotatable on ball bearings 8. The upper part of the centre shaft 2 is supported centrally on the member 6, which also supports on its top face by means of pillars 9 a rotary top plate 10. At its circumference the rotary top plate 10 carries pairs of plunger members 11, which are disposed at 90° to each other on the top plate 10 and which serve, as hereinafter described, to raise pairs of moulded bricks from the press table.

The centre shaft 2 extends upwardly through a central opening provided in the top plate 10 and is bored centrally and radially at an intermediate position in its length to provide conduits 12 for the application of vacuum applied from a suction pump, not shown.

The radial conduits are connected through piping 13 to a solenoid control valve 14 which controls the times of application of vacuum in synchronism with the other movements of the apparatus.

Suction is applied from the valve 14 through conduits 15 through an air filter 16 and flexible pipes 17 to foot suction members 18 hingedly connected on the lower ends of the plunger members 11.

At a position on the centre shaft 2 above the position of radial take-off of the piping 13 is secured a horizontally extending catch plate 19 which is connected through an eccentrically disposed vertical pin 20 to the press table drive, from which a step-by-step rotation is imparted to the catch plate 19. On its undersurface at the end of the catch plate 19 opposite the end of which the pin 20 is mounted, is pivotally mounted a spring-pressed pawl member 21 which is adapted to engage at its free end in shoulders 22 provided at angular distances of 90° apart on a catch wheel 23 secured on the upper part ofthe centre 2 and thus adapted to transmit a step-by-step rotation to the rotary top plate 10.

The plunger members 11 are secured in pairs at the outer circumference of the rotary top plate 10. The plunger members 11 are movable vertically downward by the application of pressure on upwardly projecting tappets 24 in the top of the plungers by pistons 25 of pneumatic cylinders 26 to extend coil springs 27 mounted in the plungers. On retraction of the pistons 25 the plungers move upwardly under the influence of the retracting coil springs 27.

Figure 6:
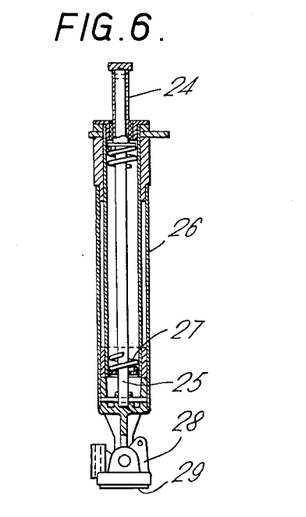
FIGURE 6 is a sectional elevation on an enlarged scale of a plunger member.

Pivotally mounted at the lower ends of the plungers are suction foot members 28 having applied on the undersurfaces rubber suction pads 29, the foot members being concave and each provided with a perimetrical rubber edge and connected to flexible pipes 17, whereby a vacuum of for example about 20″ can be applied to cause the pads 29 of the foot members 28 when in engagement with the upper flat surface of a moulded brick to engage the brick without overlap and to raise it, on the plunger being raised under the influence of the coil spring 27. The suction pads are provided with supports for the brick in the middle of the pad.

Figure 5:
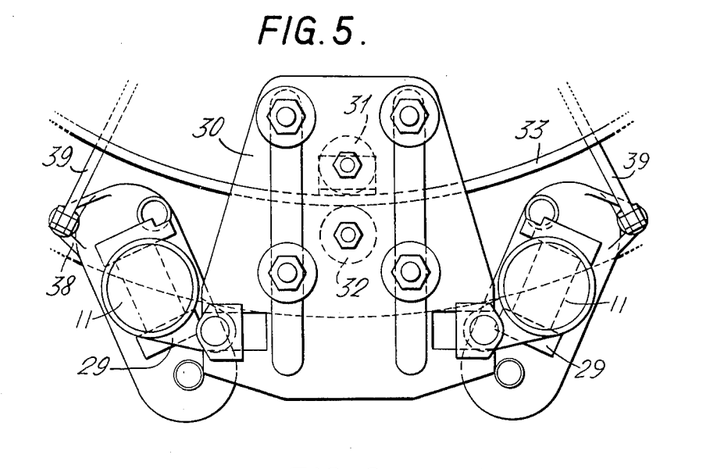
FIGURE 5 is a detail plan view of an enlarged scale of the means for turning the plunger members.

The plunger members 11 are pivotally connected through brackets 48 at their upper ends to a horizontally movable slide plate 30 which is movable radially under the influence of inner and outer guide or cam wheels or rollers respectively 31 and 32, which bear respectively on the inner and outer surfaces of a vertical cam ring 33 which is secured by brackets 34 on a horizontal plate 35 secured as by welding to the upper part of the centre pillar 1. The cam ring 33 is so curved as to provide at the appropriate times inner and outer radial movements to the slide plate 30, which movements are transmitted as rotational movements to the plunger members 11.

Secured at one end to a bracket 36 provided on each foot member 28 is a spring 37, which at the other end is secured to the plunger casing and which serves to return the foot member into its original normal position on completion of a movement to off-load a brick.

Also pivotally connected at one end to a bracket 38 on the foot member 28 is a rod 39, the other end of which rod is pivotably connected at 40 to a circular frame member 41 which surrounds the centre pillar 1 in spaced relation thereto, and is extended upwardly at an angle for connection to a horizontal frame member 42 which is carried by a vertical pillar 43 depending from the rotary top plate 10 to which it is secured as by welding. The frame member 42 at the inner end carries brushes 44 which engage inner and outer collector rings 45 and 46 respectively mounted on the undersurface of the horizontal plate 35. The solenoid valves 14 derive their current from the collector rings 45, 46 through the brushes 44. The rings 45, 46 are in two sections, one permanently live and the other controlled by a switch operated at the appropriate times by a cam in a press driven cam box, not shown. Thus operation of the vacuum valve effecting the suction feed over the bricks on the press will be held off until contact has been established with the bricks.

A brake 47, in the form of a piston plate, hydraulically operated, is mounted on the inner surface of the inverted cup-shaped member 6 to bear against a stationary part, and is automatically brought into operation to prevent over-run. The brake is of the motor vehicle type and its master cylinder is operated through a rod by an air cylinder controlled by a valve in the cam box.

In operation: the rotary top plate 10 is driven through the catch wheel 23, and catch plate 19 through the pin 20 and a rod connected to the press catch plate. The rotary top-plate 10 is rotated ¼ of a turn, or 90° of each motion of the press.

When one of the four pairs of plunger members 11 stops over the press table the following sequence of operations occurs:

(1) The pistons 25 of the pneumatic cylinders 26 depress the tappets 24 on the two plungers to extend the springs 27 and to cause the plunger members 11 to lower, and the rubber suction pads 19 on the end of the foot members 28 to engage the top flat surfaces of the two moulded bricks positioned on the press table with their major axes extending radially of the press table;

(2) The solenoid valve 14 which derives its current from the collector rings 45, 46 and brushes 44 is energised by a switch operated by a cam in the press-driven cam box to cause partial vacuum at each suction pad;

(3) The cylinders 26 retract, and the plunger members 11 rise together with the bricks, under the influence of the springs 27;

(4) The off-loader then commences to rotate through 90°;

(5) The slide plate 30 moves radially under the influence of the wheels or rollers 31, 32 moving over the cam ring 33. This inward movement of the slide plate 30 causes the plungers 11 to rotate about their own axes. Simultaneously the rods 39 cause the feet to tilt the bricks through 90° so that the bricks are held in axial alignment with the top and bottom surfaces in parallel vertical planes.

After two further ¼ turns (that is to say through 180°) of the rotary top plate the two bricks are deposited on one end of a conveyor belt disposed at a diametrically opposite position to that in which the bricks are raised from the press table.

Referring now to FIGURES 1, 7, 8, 9 and 10 of the accompanying drawings, the upper run of the conveyor belt C is supported on a juxtaposed parallel series of rollers 50. The conveyor belt C is driven by a pneumatically operated cushioned cylinder 51 pivotally mounted at one end at 52 on a stationary frame part and with the free end 53 of the piston rod 54 pivotally connected to a conveyor-belt-operating lever 55. The lever 55 drives the conveyor belt in step-by-step movement in synchronism with the movements of the rotary off-loader through an infinite ratchet 56, so that the conveyor belt C moves a distance equivalent to the thickness of a brick on each movement.

Figure 8:
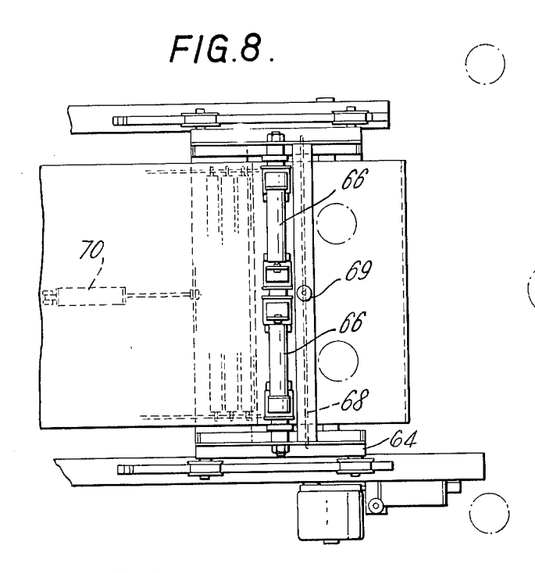
FIGURES 8 and 9 are respectively plan and sectional front elevations of the means for aligning and squaring up the bricks on the conveyor or belt.
Figure 9:
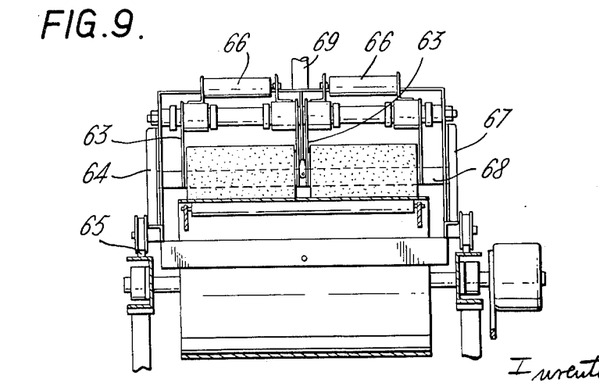

Each brick of the pair is deposited on the conveyor belt between a pair of side plates 63 carried on a wheeled trolley 64 running on rails 65. The side plates 63 are each operated to cause a lateral movement to engage the end faces of the bricks by means of pneumatically operated cylinders 66, so that the bricks are properly aligned relatively to the side edges of the conveyor belt.

The trolley 64 is constructed with end members 67 on which are mounted for vertical movement a horizontal end plate 68 which is movable vertically by pneumatically operated cylinder and piston 69 into a position to the rear of the bricks so as to square up the bricks, and so as to be adapted on movement of the trolley 64 to bear against the rear faces of the bricks and to move them as hereinafter described into contact with the pair of bricks last deposited.

The trolley 64 is moved along the conveyor belt by means of a pneumatically operated piston cylinder 70.

When the trolley has completed its travel of about 3½″, the pair of bricks should just touch the pair last deposited, but should the pairs come into contact before the carriage reaches the end of its travel, the carriage will not reach its stop.

This factor is made use of as hereinafter described to obtain variable control of the conveyor.

Figure 7:
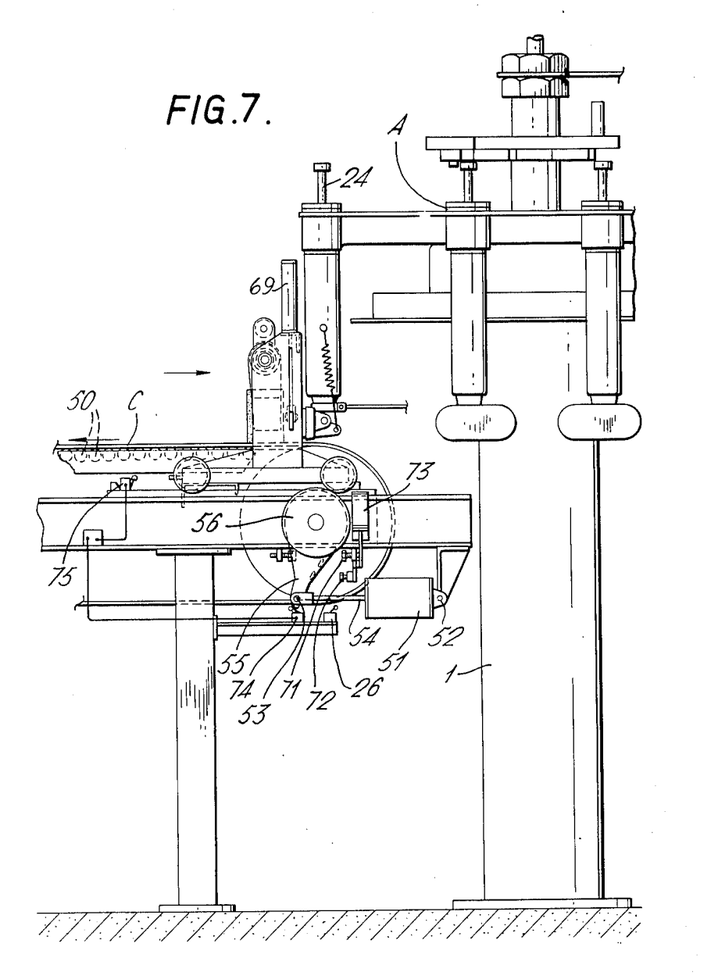
FIGURE 7 is part side elevation showing the rotary loader and the position of off-loading onto the conveyor.

The extent of travel of the conveyor belt on each stroke is determined by a fixed stop 71 and a retractable stop 72. The retractable stop 72 is operated through a pneumatically operated cylinder 73. The cylinder 73 is controlled by a solenoid valve and relay (not shown). The relay is closed by a micro-switch 74 engaging the end of the conveyor belt operating lever 55 on the return stroke of the operating lever 55 causing the stop 72 to retract. If the trolley 64 reaches its stop it makes contact with a micro-switch 74, and the retractable stop 72 drops back into place. The extent of travel of the lever 55 will then be limited by the retractable stop 72, but should the stop 72 remain retracted due to the trolley 64 not retracting its stop, the operating lever 55 will travel slightly further until it makes contact with the fixed stop 71. There will then be more room for the next pair of bricks so that the carriage will reach its stop on the next movement.

The cylinders 51, 69, 70 and 73 are all controlled by valves in a rotating cam-box driven from the press table B.

A micro switch 76 is provided in series with other switches on the stacking unit as hereinafter described, and determines the precise movement the stacking grab unit D grips the bricks and rises, relatively to the movement of the conveyor belt.

After a predetermined number of bricks in two parallel rows and in contact relation between front and back have been deposited on the conveyor belt, means are brought into synchronous operation with the conveyor belt for moving the bricks from the conveyor belt and for transporting and depositing them on to a wagon E which moves on rails not shown and carries the load of bricks in superposed rows into the furnace for further treatment as by firing, steaming or the like.

Figure 10:
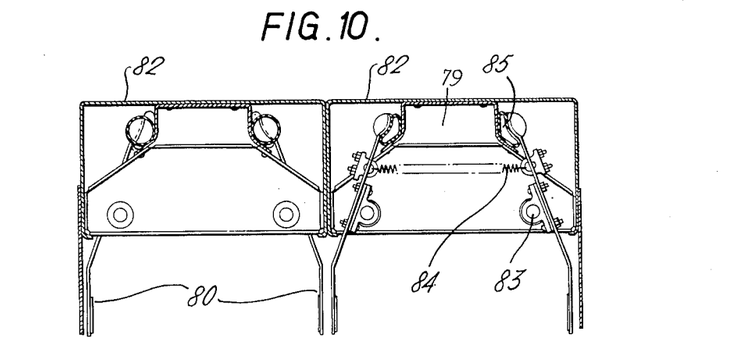
FIGURE 10 is a sectional front elevation on an enlarged scale of the brick gripping members.

The grab is electro-pneumatically operated in accordance with a previously determined set pattern and consists essentially of a parallel series of pairs of fingers 80, mounted in a juxtaposed contacting pair of casings 82, of inverted channel section, secured together at their inner contacting walls.

The fingers 80 are pivotally mounted at intermediate positions 83 of the fingers on the casings 82, and are held in the open positions by means of coil springs 84, extending between the fingers 80 and engaging them by means of hooks.

The inner ends of the fingers engage tubes 85, of a resilient substance such as rubber, which tubes are mounted on brackets 79 and in the inoperative position are deformed or collapsed by the pressure of the fingers under the influence of the springs. On passing compressed air from a source of air under pressure, the tubes 85 are expanded to cause the fingers to close and to grip the ends of each of the bricks in each row, so as to be adapted at the appropriate moment to raise the bricks from the conveyor belt. A reduction valve (not shown) is provided for the air passed through the resilient tubular elements to ensure against too great a pressure being applied on the gripping members. A maximum pressure of 50 lbs. per square inch has been found to be suitable.

Figure 1:
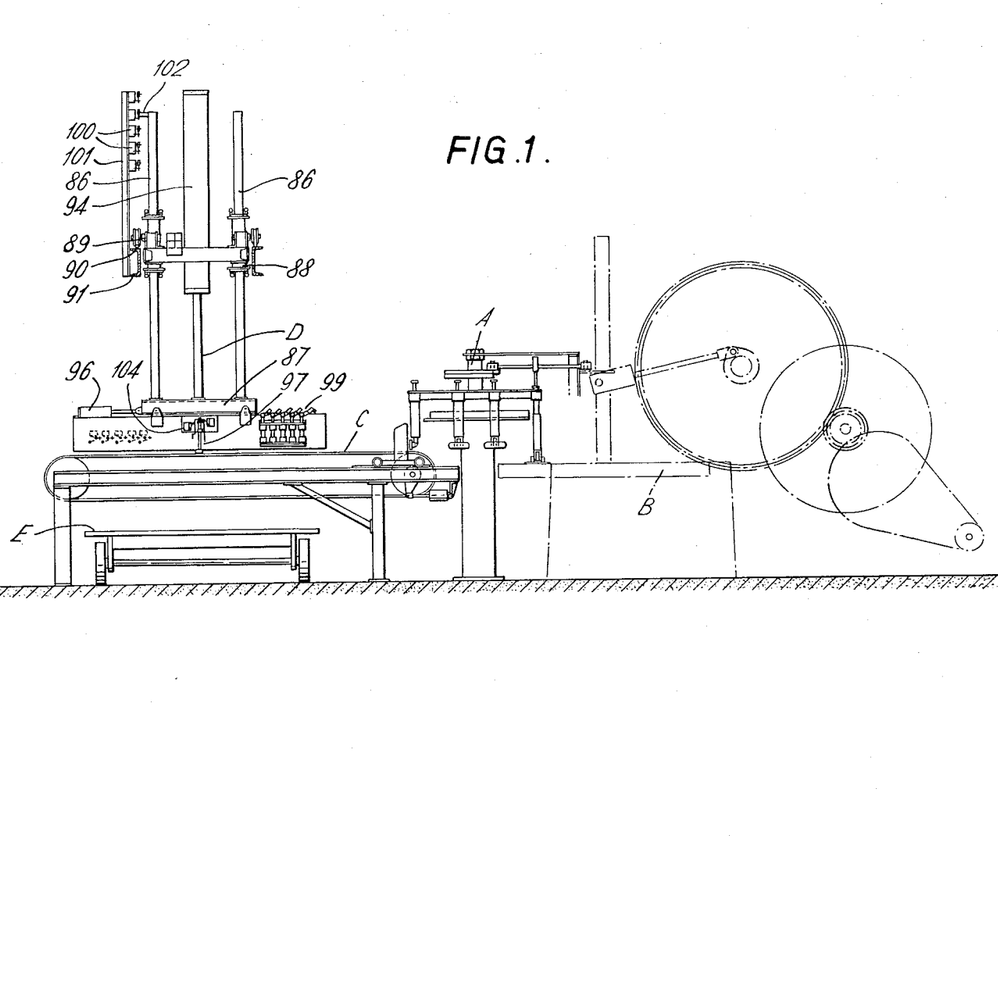
FIGURE 1 is a side elevation of apparatus according to the invention.
Figure 2:
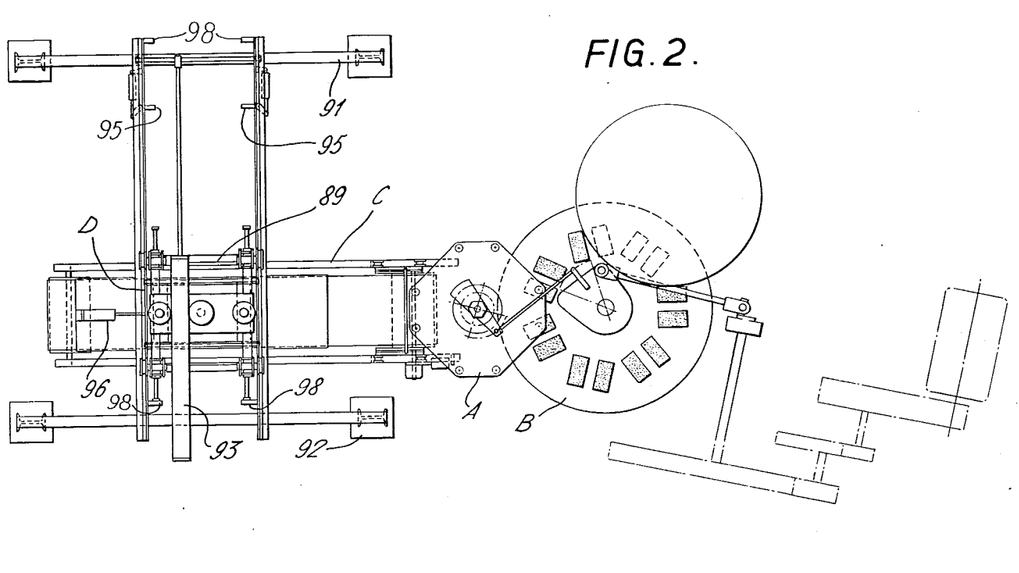
FIGURE 2 is a corresponding plan.

To raise the bricks from the conveyor belt and to deposit them on a wagon E a transporter grab D is provided. The grab comprises two guide columns 86 secured one at each end of a cradle 87 supporting the casings 82 such columns passing in sliding engagement through guide sleeves 88 secured on a carriage 89 running on rails 90 which extent in a direction transversely of the line of feed of the bricks along the conveyor belt C. The rails 90 are supported on transverse frame members 91 which are themselves supported on vertical frame members 92. The carriage 89 is moved along the rails by a pneumatic cylinder 93.

The grab is operated by an upwardly extending pneumatic cylinder 94.

The carriage 89 has three stopping places; one over the conveyor belt, one over the nearest half of the wagon E and one over the farthest half.

To stop the grab D over the nearest half of the wagon stops 95 are provided, which stops can be retracted and extended pneumatically. The limits of travel of the carriage are determined by six stops. Stops 98 stop the carriage 89 over the farthest side of the wagon E.

The grab casings 82 can be moved endwise ½ brick's width with respect to the cradle 87 by means of a cylinder 96 in order to provide a stable stack. This movement is triggered off as follows: Assuming the appropriate relay has been closed by its associated switch 100, the cylinder 96 will not move until the grab has risen its full height, at which time a switch is contacted which completes the circuit. On the grab carriage returning, the grab returns to normal by means of the operation of a "one way only" switch.

The first two rows of bricks comprising a load are laid on one side of the wagon and the next load on the other side to present four rows of bricks with each row (50 bricks) in lateral contact. The next two loads are laid on top of the rows previously laid, the grab being controlled to move downwardly in this operation a distance less by the amount of the thickness of a brick.

When descending the limit of travel of the grab is determined by feeler probes 97. The feeler probes of which there are two assemblies, one at each side, operate a number of micro-switches.

When a feeler probe contacts the last adjacent layer of bricks deposited, the following sequence of operations occurs:

(i) A micro-switch is operated which causes the downward movement of the grab to slow;

(ii) After a movement of three to four inches, two other switches are operated, one being effective to release the bricks by operating the grab valve, and one causing the downward movement of the grab to reverse. This latter switch is in series with a pressure-switch to ensure that the bricks are released before upward movement starts;

(iii) On one feeler assembly (the one which works on the far half of the wagon) there is an additional switch which is closed all the time the feeler is in contact with the bricks. This switch is in series with the switches 100. If any one of the switches 100 is closed at the same time as the switch last referred to, the appropriate relay will close to set up the grab for the next movement. This occurs during the first part of upward travel because the switches 100 are "one way" switches.

The switches 105 are operated by the bricks as they move along the conveyor. Only the end one of switches 105 is effective until the appropriate relay has rendered any of the others effective.

The probe 97 contacts the layer of bricks last laid and a switch is contacted which causes the air supply to be shut-off from the top part of the cylinder 94 which is then vented to atmosphere. At the same time the air in the lower part of the cylinder 94 is trapped and becomes compressed thereby slowing the descent of the grab. When the bricks have travelled to a distance with the lower face ¼" from the top face of the previous layer another switch is contacted which causes the air to be released.

A pressure switch causes ascent to take place.

The grab then returns to a position above the conveyor and remains stationary until the next load of bricks is ready to be removed.

The carriage 89 travels alternately to the far stop and to the near stop automatically, control being effected by limit switches, relays and solonoid valves in known manner; they do not form part of the invention.

In order to taper the stack so that the loaded wagon may more easily enter the arched door of the furnace or kiln, locking levers 99 are provided which come into operation when required to render certain of the end sets of fingers 80 ineffective, and are operated by means of switches 100 mounted in vertical superposed relation on an upstanding frame member 101 which is secured at the lower end to the outer edge of one rail, the switches being contacted by a laterally projecting member 102 mounted on one of the guide columns 86.

The setting of the switches for the next layer of bricks to be raised is always predetermined by which, if any, of the switches 100 are closed at the same time as a switch 104 on the feeler probe 97 thus determining which of the switches 105 shall be effective; whether any of the locking levers 99 shall be operated, and whether cylinder 96 shall be operated.

In one complete sequence of depositing a layer of bricks on the wagon assuming the near half of the tenth layer has just been deposited, the second switch from the top of the bank of switches 100 will be effective, the feeler probe 97 is in contact with the adjacent layer of bricks. This will close the appropriate relay to cause all the levers 99 to operate rendering all end five pairs of grab fingers 80 inoperative. At the same time the nearest of the switches 105 to the press will become effective.

The grab will continue to rise until a microswitch is contacted at the top of travel and the carriage will move to its station over the conveyor. On reaching this, a switch is contacted to cause the grab to lower on to the conveyor. When the switch 105 is contacted by the bricks progressing along the conveyor nothing happens until the switch 76 is closed. The grab then operates and on pressure being established the grab rises. On reaching the top the carriage traverses to the far stop 98 and the grab lowers. The feeler probe 97 contacts the adjacent bricks and the grab releases. On the carriage returning the stops 95 extend.

The operating sequence of the invention is as follows:

A pair of bricks is moulded and presented by the press table B for removal;

The pair of bricks is lifted by suction heads 28 from the press, moved through 180° by the rotary transfer device A and deposited on edge on the radially-moving conveyor C. The orienting of the bricks from the flat to an edge position takes place during the transfer;

The bricks are squared on the conveyor C by trolley 64 and spaced from the preceding pair deposited thereon, thus ensuring that the spacing interval is substantially the same irrespective of the individual thickness of the bricks;

Stacking of the bricks is next carried out by the overhead pressure-operated grapple or grab D, which is controlled by horizontally and vertically disposed limit microswitches 95 and 98. The procedure is as follows:

The grapple lifts a maximum load for the first layer which is deposited on the trolley. Three further layers are then deposited at the maximum width;

As the fourth layer is deposited, a switch sequence is operated in consequence of a feeler probe 97 on the grapple determining the height of the layer. In consequence, locking levers 99 are operated which render the end gripping fingers 80 of the grapple inoperative. The next layer is thus of reduced width.

As further layers are deposited, similar switching sequences are triggered by the feeler probe and further gripping fingers rendered inoperative;

The laying of the final layer causes the probe to operate a final switch sequence which returns the mechanism to the starting position.

What is claimed is:

1. Apparatus for continuously and automatically transferring moulded bricks from a press table onto a wagon or trolley for convenient removal to a kiln for further treatment, comprising a rotable table member, driving means for rotating said table member, said driving means including pawl and ratchet mechanism for rotating said table member in step-by-step motion, a plurality of pneumatically operated lifting cylinders mounted on the periphery of said table member, said cylinders being mounted in pairs, said pairs having a predetermined spaced relationship therebetween, each of said cylinders having a suction element pivotally mounted at the lower end thereof for engaging and holding bricks on the press table, each of said cylinders adapted for both rotational and vertical movement, cam means cooperating with said lifting cylinders, said cam means adapted to rotate said lifting cylinders in synchronism with the lifting movement thereof, whereby a pair of bricks are simultaneously engaged, raised and rotated so as to bring them into end to end alignment, and further means cooperating with said lifting cylinders and said cam means for tilting said bricks ninety degrees for edgewise deposit on an endless conveyor, means mounting said conveyor so as to extend radially of said table member, and means mounting said conveyor for step-by-step movement in synchronism with the movement of said table member, said conveyor carrying bricks in a radial direction away from said table member.

2. Apparatus according to claim 1, wherein each of said lifting cylinders is a piston cylinder unit including a vertically movable plunger member having a suction pad hingedly mounted on the lower end thereof, and including means for applying pressure to said plunger member to cause downward movement thereof, and vacuum means operable automatically to cause each suction pad to engage and hold a moulded brick when said suction pad is brought into contact therewith.

3. Apparatus according to claim 1, including means for correctly positioning and squaring-up the pairs of bricks deposited on said conveyor.

4. Apparatus according to claim 1 including a transporter grab unit, means mounting said grab unit to an overhead carriage, said grab unit including gripping means and co-ordinated switch means and stop means operating so as to grip and remove from said conveyor batches of bricks in a predetermined sequence of numbers and to deposit them on a wagon in a predetermined position to ensure a stable load and to facilitate the passage of the loaded wagon through the door of a kiln, said transporter grab unit being operated in synchronism with the movement of said table member and said conveyor.

5. Apparatus according to claim 2, wherein said cam means comprises a vertical cam ring mounted for rotation with said table member and cam follower means bearing against the inner and outer vertical surfaces of said cam ring, said cam follower means being mounted to horizontally reciprocal slide plates, whereby upon rotation of said table member said cam means causes horizontal radial movement of said slide plates and wherein each pair of plunger members is pivotally connected through bracket means to a slide plate, whereby horizontal radial movement of said slide plate causes each of said plunger members to rotate about their own axes, and linkage means connecting each of said suction pads to further means rotatable with said table member, whereby upon rotation of said table member said linkage means causes said suction pads to be tilted through an angle of ninety degrees.

6. Apparatus according to claim 2, wherein said piston cylinder unit includes spring means normally biasing said plunger member away from said bricks, whereby when said pressure means is cut-off said spring means serves to retract the plunger and raise the brick being held by said suction pad.

7. Apparatus according to claim 2, including a strip of conducting material mounted on said table member, and wherein solenoid valves are provided which are automatically operable by means of current taken from said conducting strip to operate said vacuum means.

8. Apparatus according to claim 2, wherein said suction pads are provided with an air blocking member so as to reduce the suction effect, thereby preventing damage to the bricks being engaged by said suction pads.

9. Apparatus according to claim 3, including a trolley having a limited extent of travel, said trolley having at least one pair of side-plate members controlled by a piston cylinder unit for correctly positioning the bricks with reference to their lateral position on said conveyor, and a backplate movable vertically by a piston cylinder unit to square-up the bricks.

10. Apparatus according to claim 4 wherein said gripping means of said transporter grab unit includes a plurality of pairs of pivoted finger members, said finger members being held in a normal open position by spring means, and expandable tube means for closing said finger members so as to cause bricks to be gripped for removal from said conveyor.

11. Apparatus according to claim 4, including electro-pneumatic control means for said transporter grab unit, said control means operating to reduce the speed of the downward movement of said unit so that the bricks being carried by said unit are deposited gently on top of the rows of bricks last laid.

12. Apparatus according to claim 9, wherein said trolley includes means mounting said side-plate members for reciprocal movement transversely thereof, said side-plate members adapted to abut against the end faces of the bricks deposited on said conveyor so as to slide the bricks laterally into a predetermied transverse position on said conveyor, said trolley further including frame means and a vertically reciprocating cross-bar supported by said frame means, said bar adapted to bear against the rear end faces of each pair of bricks to thereby square-up the bricks and to push them along said conveyor into contact with the last pair of bricks previously laid thereon.

13. Apparatus according to claim 10, including lever means for preventing operation of selected pairs of said finger members so as to vary the number of bricks removed in a batch from said conveyor and deposited on said wagon.

14. Apparatus according to claim 10, wherein said transporter grab unit includes support means for said gripper finger members, a cradle member secured to said support means, guide columns slidably carried in guide sleeves and secured to said cradle member, and means mounting said guide sleeves to said carriage, said carriage adapted for to and fro travel in a direction transversely of said conveyor.

References Cited by the Examiner

UNITED STATES PATENTS

| | | |
|---|---|---|
| 1,176,258 | 3/1916 | Warner. |
| 1,222,535 | 4/1917 | Crum. |
| 1,440,769 | 1/1923 | Cote. |
| 2,213,629 | 9/1940 | Fontaine. |
| 2,359,433 | 10/1944 | McNamara. |
| 2,545,799 | 3/1951 | Snow. |
| 2,955,717 | 10/1960 | Segur. |
| 3,037,644 | 6/1962 | Segur. |

FOREIGN PATENTS

| | | |
|---|---|---|
| 1,062,188 | 12/1953 | France. |
| 1,096,831 | 1/1961 | Germany. |

GERALD M. FORLENZA, *Primary Examiner.*

ERNEST A. FALLER, HUGO O. SCHULZ, *Examiners.*